US010427464B2

(12) United States Patent
Watanabe

(10) Patent No.: US 10,427,464 B2
(45) Date of Patent: Oct. 1, 2019

(54) PNEUMATIC TIRE AND METHOD OF PRODUCING THE SAME

(71) Applicant: BRIDGESTONE CORPORATION, Chuo-ku, Tokyo (JP)

(72) Inventor: Toshiyuki Watanabe, Higashiyamato (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 415 days.

(21) Appl. No.: 14/762,552

(22) PCT Filed: Feb. 4, 2014

(86) PCT No.: PCT/JP2014/000580
§ 371 (c)(1),
(2) Date: Jul. 22, 2015

(87) PCT Pub. No.: WO2014/129130
PCT Pub. Date: Aug. 28, 2014

(65) Prior Publication Data
US 2015/0360518 A1 Dec. 17, 2015

(30) Foreign Application Priority Data

Feb. 20, 2013 (JP) .................................. 2013-030814

(51) Int. Cl.
*B60C 19/00* (2006.01)
*B60C 11/03* (2006.01)
(Continued)

(52) U.S. Cl.
CPC ............ *B60C 11/0304* (2013.01); *B05D 1/06* (2013.01); *B05D 1/14* (2013.01); *B29D 30/06* (2013.01);
(Continued)

(58) Field of Classification Search
CPC . B60C 19/002; B60C 11/033; B60C 11/0304; B05D 1/14; B05D 1/06
See application file for complete search history.

(56) References Cited

U.S. PATENT DOCUMENTS

2005/0205183 A1* 9/2005 Yukawa ................ B60C 19/002
152/450
2008/0257466 A1 10/2008 Fujita
(Continued)

FOREIGN PATENT DOCUMENTS

EP 1541380 A1 6/2005
EP 2366533 A1 9/2011
(Continued)

OTHER PUBLICATIONS

Machine translation for Japan 2012-250635 (no date).*
(Continued)

*Primary Examiner* — Steven D Maki
(74) *Attorney, Agent, or Firm* — Kenja IP Law PC

(57) ABSTRACT

Disclosed is a pneumatic tire that includes a tread having a pattern asymmetrical about the tire equatorial plane, and that may reduce cavity resonance and has good steering stability. A pneumatic tire includes a tread portion having a pair of tread halves, the tread halves extending between the tire equatorial plane and respective outer ends in the tire width direction of the tread portion, respectively, and having different negative ratios. The tread portion has short fibers fixed to at least a portion of a tire inner peripheral surface of the tread portion, and one of the tread halves with a higher negative ratio has a higher short-fiber fixation area ratio than that of the other tread half.

6 Claims, 2 Drawing Sheets

(51) Int. Cl.
*B05D 1/06* (2006.01)
*B05D 1/14* (2006.01)
*B29D 30/06* (2006.01)
*B60C 5/00* (2006.01)

(52) U.S. Cl.
CPC .............. *B60C 5/00* (2013.01); *B60C 11/033* (2013.01); *B60C 11/0306* (2013.01); *B60C 11/0332* (2013.01); *B60C 19/002* (2013.01)

(56) References Cited

U.S. PATENT DOCUMENTS

| | | | | |
|---|---|---|---|---|
| 2010/0294406 | A1* | 11/2010 | Tanno | B60C 19/002 152/157 |
| 2011/0220264 | A1* | 9/2011 | Nagai | B29D 30/0654 152/548 |

FOREIGN PATENT DOCUMENTS

| | | | |
|---|---|---|---|
| JP | 2003104013 | A | 4/2003 |
| JP | 2004-082387 | A | 3/2004 |
| JP | 2009046089 | A | 3/2009 |
| JP | 2009-298236 | A | 12/2009 |
| JP | 2010-058781 | A * | 3/2010 |
| JP | 2012-250635 | A * | 12/2012 |
| JP | 2012-250635 | A | 12/2012 |
| WO | 2005068225 | A1 | 7/2005 |

OTHER PUBLICATIONS

Machine translation for Japan 2010-058781 (no date).*
Mar. 4, 2014 International Search Report issued in International Patent Application No. PCT/JP2014/000580.

* cited by examiner

PNEUMATIC TIRE AND METHOD OF PRODUCING THE SAME

TECHNICAL FIELD

This disclosure relates to a pneumatic tire and a method of producing the same.

BACKGROUND

It is known that a pneumatic tire, due to structures thereof, exhibits a cavity resonance phenomenon caused by the length of a circular tube inside the tire. Further, a pneumatic tire, regardless of the type, generates noise having cavity resonance frequency in the range of 200 Hz to 270 Hz according to a circumference length thereof, and said noise is a main cause for unpleasant vehicle-interior noise.

As described above, since air resonance in the interior of the tire is a generation factor of the vehicle-interior noise, a method for absorbing noise in the interior of a tire is effective as an improvement method. Examples of conventionally proposed methods include, as disclosed in JP200482387A (PTL 1), a technique of adhering short fibers to a tire inner peripheral surface. This technique is characterized in that the adhesive used for a tire inner peripheral surface is dried to form an adhesive layer with high rigidity and, consequently, rigidity increases at those portions to which short fibers are adhered.

Additionally, some passenger car tires adopt a tread having a pattern asymmetrical about the tire equatorial plane, from the viewpoint of abrasion resistance and the like. Such a tire has the problem that the rigidity tends to decrease on the side of the tread pattern where the negative ratio (the proportion of groove portions (portions not contacting the ground) in the tread) is higher, and the rigidity tends to be unbalanced in the lateral direction of the tread portion, with the result that good steering stability may not be obtained. This also applies to the tires with short fibers adhered to the tire inner circumferential surfaces as stated above.

CITATION LIST

Patent Literature

PTL 1: JP200482387A

SUMMARY

Technical Problem

It could thus be helpful to provide a pneumatic tire that is provided with a tread having a pattern asymmetrical about the tire equatorial plane, and that can reduce cavity resonance and provide good steering stability. It could also be helpful to provide a method of producing a pneumatic tire that can efficiently produce such a pneumatic tire.

Solution to Problem

A pneumatic tire disclosed herein comprises a tread portion that has short fibers fixed to at least a portion of a tire inner peripheral surface of the tread portion, and that has tread halves, in which one of the tread halves with a higher negative ratio has a higher short-fiber fixation area ratio than that of the other tread half.

In the pneumatic tire disclosed herein, the short fibers fixed to at least a portion of the tire inner peripheral surface of the tread portion may reduce cavity resonance during driving and, furthermore, adhesive layers for fixing the short fibers can increase the rigidity of one of the tread halves that has a lower rigidity, namely, a higher negative ratio, making it possible to correct the imbalance of rigidity between the tread halves and to achieve good steering stability.

As used herein, the term "tread" refers to a portion of a tire that is present in the tire radial direction, over a range in the tire width direction corresponding to a tread surface. Here, the term "tread surface" refers to, for a tire assembled onto an applicable rim and filled to a prescribed internal pressure, an outer peripheral surface of the tire around the circumference thereof that is formed by those portions (including groove portions, if any, formed in the outer peripheral surface of the tire) that are brought into contact with the road surface when the tire is rotated under a load corresponding to the maximum load capacity. The above "applicable rim" refers to a standard rim ("Design Rim" in the YEAR BOOK of TRA below, and "Measuring Rim" in the STANDARDS MANUAL of ETRTO below) specified by the standards below in accordance with tire size, "prescribed internal pressure" refers to air pressure specified by the standards below in accordance with the maximum load capability, and the "maximum load capability" refers to the maximum mass that the tire is allowed to bear according to the standards below. The standards are determined by valid industrial standards for the region in which the tire is produced or used, such as the "Year Book" of "THE TIRE AND RIM ASSOCIATION, INC. (TRA)" in the United States of America, "The European Tire and Rim Technical Organization (ETRO)" in Europe, and the "JATMA YEAR BOOK" of "the Japan Automobile Tire Manufacturers Association (JATMA)" in Japan.

The aforementioned "negative ratio" refers to the proportion that groove portions, namely, portions not contacting the ground, in a tread pattern occupy in the area of a target region on the tread surface.
The aforementioned "short-fiber fixation area ratio" refers to the proportion of the fixation area of short fibers per unit area of a target region in the outer or inner peripheral surface of the tire.
As used herein, "negative ratio," other tire dimensions, and the like are intended to be measured for a tire assembled onto an applicable rim under a prescribed internal pressure and under no-load condition.

A method of producing the aforementioned pneumatic tire disclosed herein comprises: applying an adhesive to at least a portion of the tire inner peripheral surface of the tread portion; and adhering short fibers to the portion to which the adhesive has been applied, wherein one of the tread halves with a higher negative ratio has a higher short-fiber fixation area ratio than that of the other tread half.
According to the method of producing the pneumatic tire, it is possible to produce such a pneumatic tire in a more efficient way that has good steering stability and can suppress the generation of cavity resonance.

According to one of the disclosed aspects of the method of producing the pneumatic tire disclosed herein, after the applying, the short fibers are provided on the tire inner peripheral surface by electrostatic flocking. In this case, the short fibers may easily be fixed to the tire inner peripheral surface of the tire in a state where the short fibers stand upright thereon, which makes it possible to more efficiently produce a pneumatic tire that enables obtaining a noise-absorbing effect.

Advantageous Effect

According to the disclosure, it is possible to provide a pneumatic tire that comprises a tread having a pattern asymmetrical about the tire equatorial plane, and that may reduce cavity resonance and has good steering stability. According to the disclosure, it is also possible to provide a method of producing a pneumatic tire that may produce such a pneumatic tire in an efficient way.

DETAILED DESCRIPTION

Figure 1A:
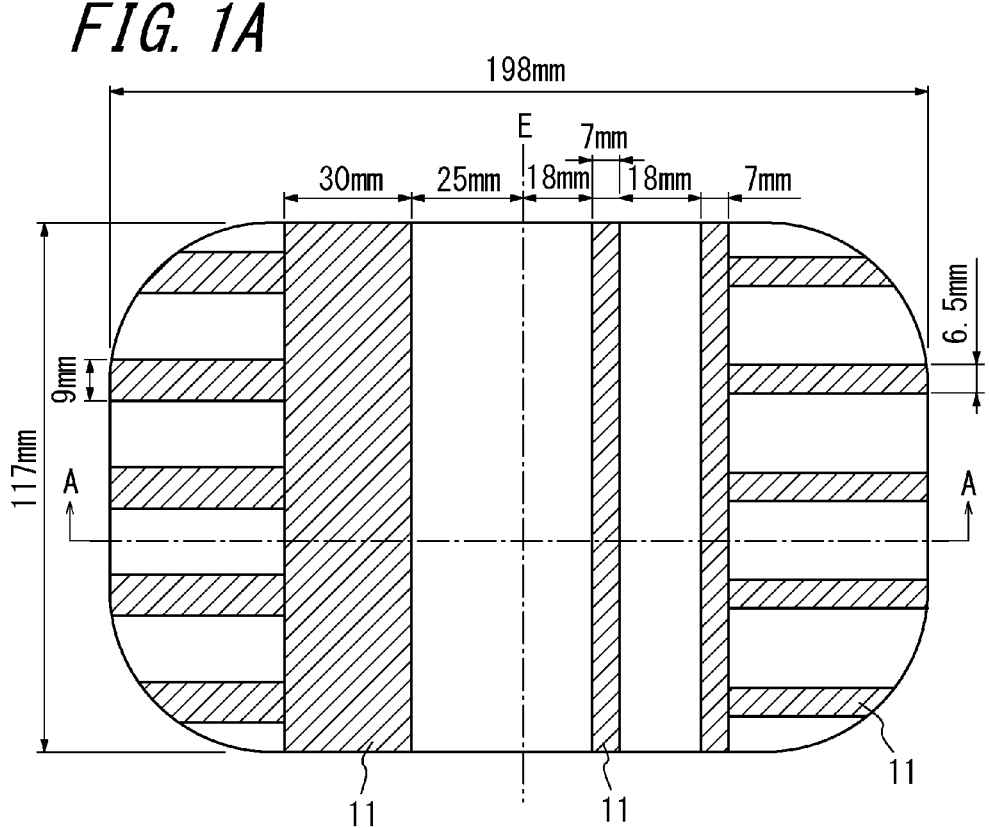
FIG. 1 illustrates a part of the tread pattern of a pneumatic tire disclosed herein according to one of the disclosed embodiments, where (A) is a top plan view and (B) is a cross sectional view in the tire width direction taken along line A-A.

Intense study was made to investigate how to provide a pneumatic tire comprising a tread having a pattern asymmetrical about the tire equatorial plane that can reduce cavity resonance and offer good handling stability, and a method that can efficiently produce such a pneumatic tire. As a result, it was found that the imbalance of rigidity between the tread halves can be reduced when more adhesive layers are arranged in one tread half whose tread pattern has a higher negative ratio than the other. It was also discovered that the cavity resonance of the tire can be reduced by arranging short fibers in the adhesive layers. As a result, the pneumatic tire and method disclosed herein were completed.

The following describes the pneumatic tire and method disclosed herein in detail with reference to the drawings. FIG. 1(B) is a cross sectional view in the tire width direction of one embodiment of the pneumatic tire disclosed herein. The pneumatic tire shown in FIG. 1 has a pair of bead portions 1; a pair of sidewall portions 2; a tread portion 3 continued to the respective sidewall portions 2; a carcass 4 formed from one carcass ply extending in a toroidal shape across the pair of bead portions 1 for reinforcing the bead portions 1, the sidewall portions 2 and the tread portion 3; a belt 5 formed from two belt layers disposed on the outer side in the tire radial direction of the carcass 4 in the tread portion 3; a single belt reinforcing layer 6 disposed on the outer side in the tire radial direction of the belt 5; a bead filler 8 disposed on the outer side in the tire radial direction of a bead core 7 embedded in each of the bead portions 1; and an inner liner 9 disposed on the tire inner peripheral surface side of the carcass 4.

The carcass 4 of the example shown in FIG. 1 is formed from a single carcass ply and has a main body portion extending in a toroidal shape across the pair of bead cores 7 and a turn-up portion wound around each bead core 7 from the inner side toward the outer side in the tire widthwise direction then toward the outer side in the tire radial direction. The number of plies and the structure of the carcass 4, however, are not limited to those in the aforementioned example in the pneumatic tire described herein. The bead filler 8 is disposed between the main body portion and each turn-up portion of the carcass in the pneumatic tire of the example shown in FIG. 1.

In the tread portion 3 of the pneumatic tire of the example shown in FIG. 1, the belt 5 formed from two belt layers is disposed on the outer side in the tire radial direction of a crown portion of the carcass 4. The belt layers are steel cord layers coated with rubber and extending to be inclined with respect to the tire equatorial plane E. The two belt layers of the example shown in FIG. 1 are laminated such that steel cords constituting one belt layer intersect steel cords constituting the other belt layer with respect to the tire equatorial plane E, to together constitute the belt 5. Although the belt 5 shown in FIG. 1 is formed from two belt layers, the number of the belt layers constituting the belt 5 may be three or more in the pneumatic tire disclosed herein. Although the pneumatic tire shown in FIG. 1 has the single belt reinforcing layer 6 disposed on the outer side in the tire radial direction of the belt 5, the pneumatic tire described herein may lack the belt reinforcing layer 6 or may have two or more belt reinforcing layers 6.

Figure 1B:
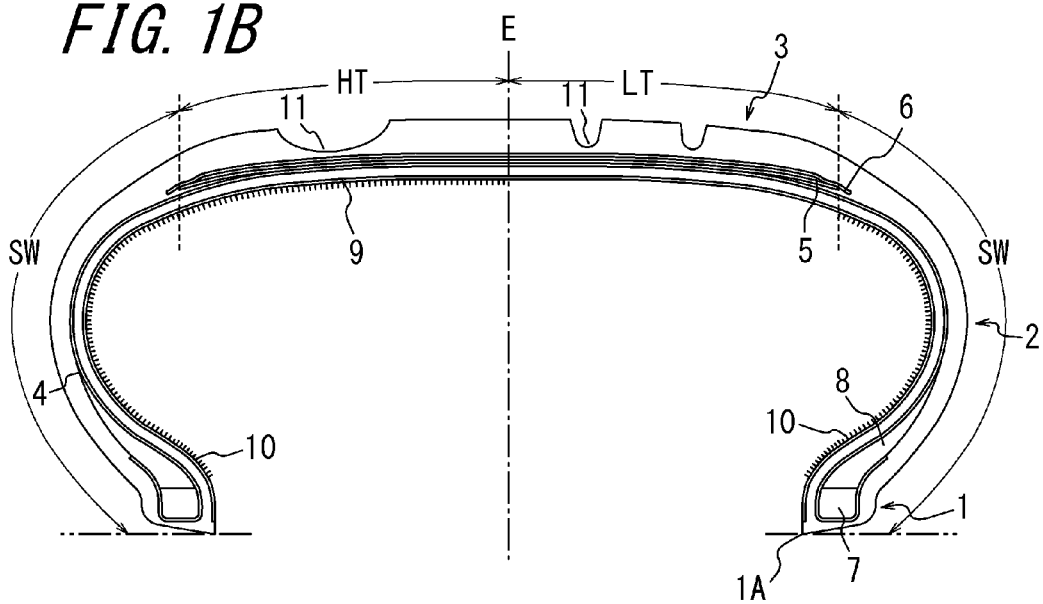

While the belt 5 is shown as being symmetrical across the tire equatorial plane E, the tread portions on the left and right sides of the figure have different tread patterns about the tire equatorial plane, as shown in FIG. 1(A). In this case, hatched portions in FIG. 1 (A) are groove portions 11, and regions extending between the tire equatorial plane E and respective outer ends in the tire width direction of the belt 5 represent tread halves HT, LT, respectively, where the tread half HT contains more groove portions 11, i.e., it has a higher negative ratio.

In the tire having such an asymmetrical tread pattern, the higher negative ratio of one tread half is preferably 20% to 60%, and the lower negative ratio of the other tread half is preferably 10% to 50%.

In the pneumatic tire shown in FIG. 1, many short fibers 10 are fixed by an adhesive to at least a portion of a tire inner peripheral surface of the tread portion, namely, at least a portion of the inner liner 9 on the side of the inner peripheral surface of the tire. Assuming that the tread portion is split into two tread halves HT, LT by the tire equatorial plane, one tread half HT with a higher negative ratio has a higher proportion of short-fiber fixation area on the tire inner peripheral surface, as compared to the other tread half LT. When viewed in a widthwise section, the pneumatic tire has short fibers 10 fixedly provided on at least a portion of the tire inner peripheral surface of the tread portion. Thus, the short fibers 10 are provided on the inner surface of an air chamber formed when the tire is mounted on a rim. The short fibers 10 thus fixed to the tire inner peripheral surface absorb cavity resonance, and may reduce noise caused by the cavity resonance phenomenon.

In the tire inner peripheral surface, by setting the short-fiber fixation area ratio of the tread half HT with a higher negative ratio to be higher than that of the tread half LT, the rigidity of the tread half HT, which would otherwise be low if no short fibers are fixed, may be enhanced by the rigidity of the adhesive layer, and the imbalance of rigidity between the tread halves HT and LT may be reduced, resulting in good steering stability.

Examples of the short fibers 10 include short fibers of organic synthetic fibers, inorganic fibers, regenerated fibers, natural fibers and the like. Examples of organic synthetic fibers include fibers made of: polyolefin such as polyethylene, polypropylene, and polybutylene; aliphatic polyamide such as nylon; aromatic polyamide such as Kevlar; polyester such as polyethylene terephthalate, polyethylene naphthalate, polyethylene succinate, and polymethyl methacrylate; syndiotactic 1,2-polybutadiene; acrylonitrile-butadiene-styrene copolymers; polystyrene; and copolymers thereof.

Examples of inorganic fibers include carbon fiber, glass fiber and the like. Examples of regenerated fibers include rayon, cupra, and the like. Examples of natural fibers include cotton, silk, wool, and the like.

In the pneumatic tire disclosed herein, it is preferred that the short fibers 10 are fixed to the tire inner peripheral surface of the tread portion so that they are situated only in the tread half HT with a higher negative ratio. This configuration may correct the unbalance of rigidity between the tread halves HT, LT using a minimum amount of adhesive.

In the pneumatic tire, it is also preferred that the short fibers 10 are fixed to the tire inner peripheral surface so that they are situated either in part of or throughout the tire side regions, which extend from the outer ends in the tire width direction of the tread portion 3 to the inner ends 1A in the tire radial direction of the bead portion 1, respectively. It is particularly preferred that the short fibers are fixed to the tire inner peripheral surface throughout the tire side regions excluding the rim attachment portions, as shown in FIG. 1(B). In this way, fixing the short fibers 10 to the tire side regions may reduce the cavity resonance of the tire more easily without affecting the steering stability thereof, than in the case of a tire without fixing short fibers to these regions.

In the pneumatic tire disclosed herein, the short fibers are disposed preferably at a density of 100 fibers/cm$^2$ or more in the region where the short fibers are fixed to the tire inner peripheral surface in the tire side regions. By doing so, a reduction effect of cavity resonance sound can surely be obtained. From the viewpoint of obtaining an even better cavity resonance sound reduction effect, the short fibers are disposed more preferably at a density of 500 fibers/cm$^2$ or more, and particularly preferably at a density of 1,000 fibers/cm$^2$ or more and 20,000 fibers/cm$^2$ or less.

In another preferable example of the pneumatic tire, the average length of the short fibers is 0.5 mm to 10 mm. By setting the length of short fibers to 0.5 mm or more, the effect of reducing the cavity resonance sound can be sufficiently obtained. On the other hand, by setting the average length of short fibers to 10 mm or less, it is possible to avoid the problem of tangling between short fibers which leads to an insufficient expression of noise-absorbing effect. From the same viewpoint, the average length of the short fibers is particularly preferably 2 mm to 8 mm.

The area where short fibers are fixed is preferably 25% or more, particularly preferably 50% or more, and further preferably 70% or more of the area of the tire inner peripheral surface. In this respect, the short-fiber fixation area ratio in the tread half HT with a higher negative ratio is higher than that in the other tread half LT. Specifically, the short-fiber fixation area ratio in the tread half HT is preferably 50% or more, and particularly preferably 70% or more. By setting the short-fiber fixation area ratio within the tread half HT to be 50% or more, the cavity resonance can surely be reduced.

To balance the rigidity between the tread halves, the short-fiber fixation area ratio in the other tread half LT is preferably 0% to 25%.

In another preferable example of the pneumatic tire, the average diameter of the short fibers is 1 μm to 500 μm. In this way, thread breakage in a production process of the short fibers is suppressed, and a decrease in productivity of the short fibers can be suppressed. Further, it is possible to suppress the increase in rolling resistance caused by the increase in tire weight, and suppress the decrease in the fuel consumption rate of a vehicle on which the tires are mounted.

In the pneumatic tire, the ratio (L/D) of length (L) to diameter (D) of the short fibers is preferably in the range of 5 L/D 2000. With a ratio (L/D) of length to diameter of less than 5, the effect of reducing cavity resonance becomes small. On the other hand, with a ratio (L/D) of length to diameter exceeding 2,000, tangling may be caused between the short fibers and lead to an insufficient expression of noise-absorbing effect.

In the pneumatic tire, it is preferred that the region where the short fibers are fixed is formed by multiple groups of short fibers, and that the groups of short fibers are fixed independently from each other. By discontinuously providing regions where short fibers are fixed, even if an adhesive layer comes off, the area of coming off is kept very small, and the effect of suppressing cavity resonance can be maintained.

A method of producing the aforementioned pneumatic tire disclosed herein comprises: applying an adhesive to at least a portion of the tire inner peripheral surface of the tread portion; and adhering short fibers to the part to which the adhesive has been applied. In the adhering the short fibers, one of the tread halves with a higher negative ratio has a higher short-fiber fixation area ratio than that of the other. According to the tire producing method disclosed herein, it is possible to efficiently produce a pneumatic tire that is capable of preventing deterioration of steering stability and suppressing the generation of cavity resonance.

According to the tire producing method, a pneumatic tire capable of producing an excellent noise-absorbing effect as mentioned above may be manufactured by first applying an adhesive to a short-fiber fixation part situated on at least a portion of the tire inner peripheral surface of the tread portion, then adhering short fibers 10 to the portion to which the adhesive has been applied.

The adhesive to be used is not limited to a particular type and any adhesive can be used. A polyurethane resin adhesive, an acrylic resin adhesive, an epoxy resin adhesive, and the like are suitably used. The thickness of the formed adhesive layer is also not particularly limited as long as it does not exceed the length of short fibers. A thickness of 50 μm to 500 μm is preferable.

In the method of producing the pneumatic tire disclosed herein, the short fibers 10 are preferably adhered to the tire inner peripheral surface by electrostatic flocking after the applying process i.e. during the adhering process. The short fibers 10 can be adhered to the tire inner peripheral surface by various methods. However, by applying an electrostatic flocking process, the short fibers 10 can easily be fixed to the tire inner peripheral surface in a state where the short fibers 10 stand upright thereon, and a pneumatic tire that enables obtaining a noise-absorbing effect can be efficiently produced.

Electrostatic flocking is a processing technique of electrically charging short fibers and attaching the short fibers, by electrostatic force, perpendicularly to an object with an adhesive applied thereto in advance. Therefore, it enables uniformly attaching short fibers to an object surface having a complicated shape and is suitable for attaching the short fibers 10 to a tire inner peripheral surface having a three-dimensional curvature.

The pneumatic tire disclosed herein is generally assembled onto a rim, and as a tire-rim assembly, it is mounted on a desired vehicle for use. In order to further enhance the effect of reducing cavity resonance, the aforementioned short fibers may be fixed to a part of or the whole rim.

EXAMPLES

Although the disclosure will be described below in further detail with reference to examples, the disclosure is not intended to be limited in any way to the following examples.

Example 1 and Comparative Examples 1 and 2

Tires of the same specification having the tread pattern as shown in FIG. 1 were prepared with or without short fibers made of nylon being attached to a predetermined region therein by flocking. For each tire, cavity resonance and steering stability were measured as described below. The tires used were of tire size 255/35R20 with the structure as shown in FIG. 1. Specifically, the tread portion of each tire is split into two sides, serial side (tread half HT) and opposite serial side (tread half LT), by the equatorial plane E, and the negative ratio on the serial side is set to be 48% and the negative ratio of the opposite serial side is set to be 26%. Rims of 8.5J-20 were used. Note that the maximum width BW in the tire width direction of each belt layer is 78% of the maximum width of the tire.

Figure 2:
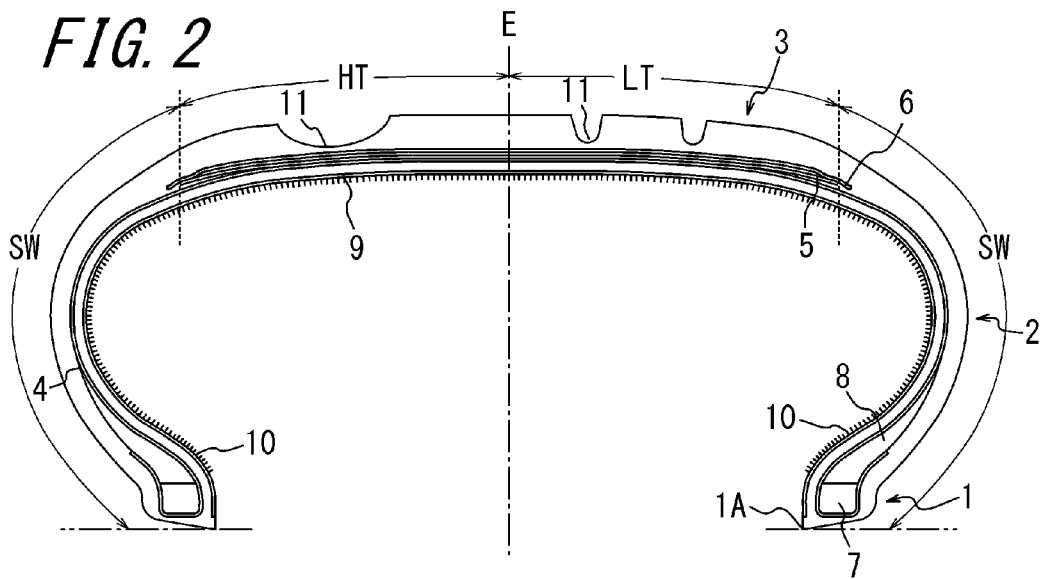
FIG. 2 is a cross sectional view in the tire width direction of a pneumatic tire of comparative example 2.

Example 1 is a tire as shown in FIG. 1(B) that has short fibers attached by flocking to regions of the inner peripheral surface, ranging from the equator plane E to the inner ends 1A in the tire radial direction of the bead portion 1 on the serial side (excluding the rim attachment portions). Comparative example 1 is a tire that has no short fibers provided on the tire inner peripheral surface, and comparative example 2 is a tire that has short fibers attached by flocking to the entire tire inner peripheral surface excluding the rim attachment portions (FIG. 2). The conditions of short fibers used in the short-fiber fixation regions were consistent among all the tires, and were set as follows: density: 2,000 short fibers/cm$^2$; average length: 4 mm; average diameter: 50 μm; and short-fiber fixation area ratio in short-fiber fixation regions: 100%. For each tire of example 1 and comparative examples 1 and 2, cavity resonance and steering stability were evaluated as follows.

<Cavity Resonance>

Figure 3:
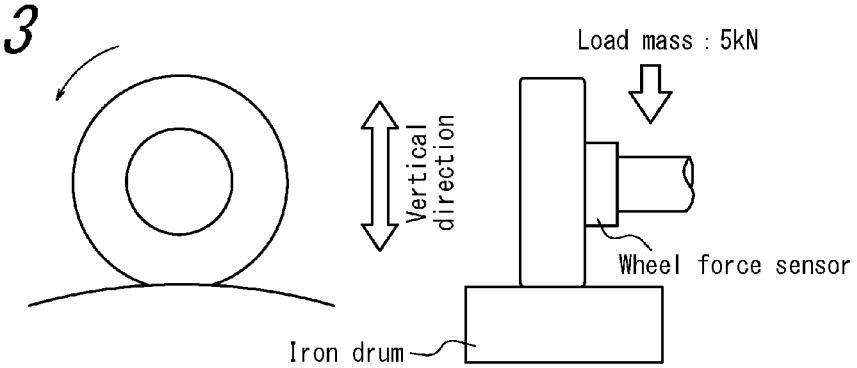
FIG. 3 is a schematic diagram illustrating a device for measuring cavity resonance and the principle thereof.
Figure 4:
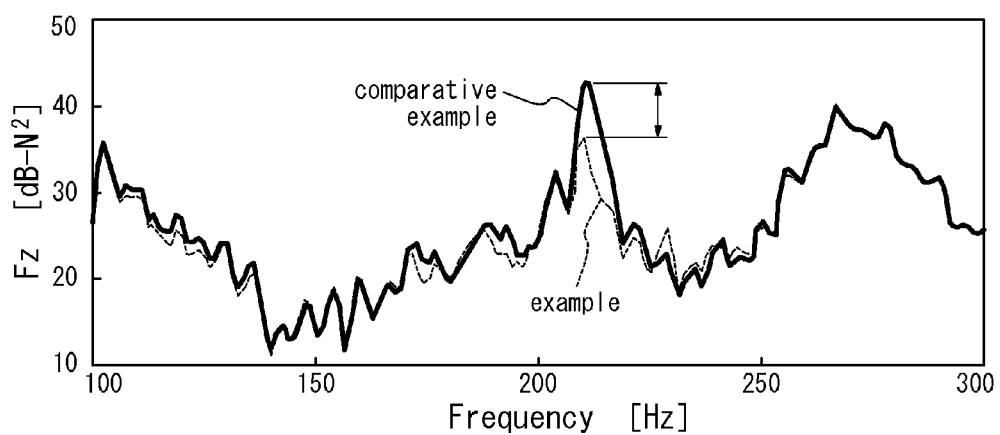
FIG. 4 is a graph presenting measurement results of cavity resonance for tires of example 1, and comparative examples 1 and 2.

Each sample tire was assembled onto a rim of 8.5J-20, and rotated under the conditions of internal pressure of 260 kPa, tire load mass of 5.0 kN, and speed of 80 km/h, using a drum tester equipped with an iron drum having an iron plate surface with a diameter of 1.7 m, as shown in FIG. 3, to measure and evaluate the generated vertical tire axial force using a wheel force sensor. The frequency spectrum of the results is shown in FIG. 4. In the spectrum shown in FIG. 4, a lower peak at 210 Hz represents a larger reduction in cavity resonance of the tire. From the spectrum shown in FIG. 4, reduction in the peak of each sample tire compared to the tire of comparative example 1 was determined (in dB).

<Steering Stability>

As an index of cornering characteristics of a tire which is dominant over steering characteristics of a vehicle, CP (cornering power) measured using a flat-belt type testing machine was evaluated. Each sample tire was assembled onto a rim of 8.5J-20, then rotated under the conditions of inner pressure of 260 kPa, load mass of 5.0 kN, and speed of 80 km/h, using a flat-belt type testing machine, to measure the stress produced in the tire at slip angles of ±0 degrees, 0.5 degrees, and 1 degree, respectively, and to determine the inclination (kgf/deg) at 0 degrees. With CP of 1.5 kN/deg or more, steering stability is considered sufficient.

TABLE 1

| | Reduction in peak at around 210 Hz [dB] | Steering Stability CP [kN/deg] |
|---|---|---|
| Example 1 | 5.7 | 1.55 |
| Comparative Example 1 | Reference | 1.40 |
| Comparative Example 2 | 6.1 | 1.41 |

In FIG. 4, peaks at around 210 Hz result from cavity resonance, and it can be seen that the tire of example 1 yielded a large reduction, approximately 4 dB, as compared to comparative example 1. It can also be seen that example 1 exhibited improved steering stability as compared to comparative examples 1 and 2.

REFERENCE SIGNS LIST

1 Bead portion
1A Inner end in tire radial direction of bead portion
2 Sidewall portion
3 Tread portion
4 Carcass
5 Belt
6 Belt reinforcing layer
7 Bead core
8 Bead filler
9 Inner liner
10 Short fiber
11 Groove portion
BW Maximum width in tire widthwise direction of belt layer
E Tire equatorial plane
HT, LT Tread halves

The invention claimed is:

1. A pneumatic tire comprising a tread portion and tire side regions, the tread portion having an asymmetrical tread pattern and a pair of tread halves, the tread halves extending between a tire equatorial plane and respective outer ends in the tire width direction of the tread portion, respectively, and having different negative ratios,
    wherein the tread portion has short fibers fixed to at least a portion of a tire inner peripheral surface of the tread portion, the short fibers are situated only in one of the tread halves with a higher negative ratio, and the tread half with a higher negative ratio has a short-fiber fixation area ratio of 50% or more, and
    wherein short fibers are also fixed to at least a portion of a tire inner peripheral surface of the tire side regions.

2. A method of producing the pneumatic tire as recited in claim 1, the method comprising:
    applying an adhesive to at least a portion of the tire inner peripheral surface of the tread portion of the one of the tread halves with a higher negative ratio and at least a portion of the tire inner peripheral surface of the side regions; and
    adhering short fibers to the portions to which the adhesive has been applied, so that the short fibers are situated only in the one of the tread halves with a higher negative ratio and the side regions, and
    wherein one of the tread halves with a higher negative ratio has a short-fiber fixation area ratio of 50% or more.

3. The method of producing the pneumatic tire according to claim 2, wherein after the applying, the short fibers are provided on the tire inner peripheral surface by electrostatic flocking.

4. The method of producing the pneumatic tire according to claim 2, wherein a ratio (L/D) of length (L) to diameter (D) of the short fibers is in a range of $5 \leq L/D \leq 2000$.

5. The pneumatic tire according to claim 1, wherein a ratio (L/D) of length (L) to diameter (D) of the short fibers is in a range of $5 \leq L/D \leq 2000$.

6. The pneumatic tire according to claim 1, further comprising an adhesive layer for fixing the short fibers on the tire inner peripheral surface.

\* \* \* \* \*